H. I. CHEW & W. S. SERGEANT.
RESILIENT WHEEL.
APPLICATION FILED MAY 19, 1914. RENEWED SEPT. 30, 1915.
1,177,486.
Patented Mar. 28, 1916.
2 SHEETS—SHEET 1.
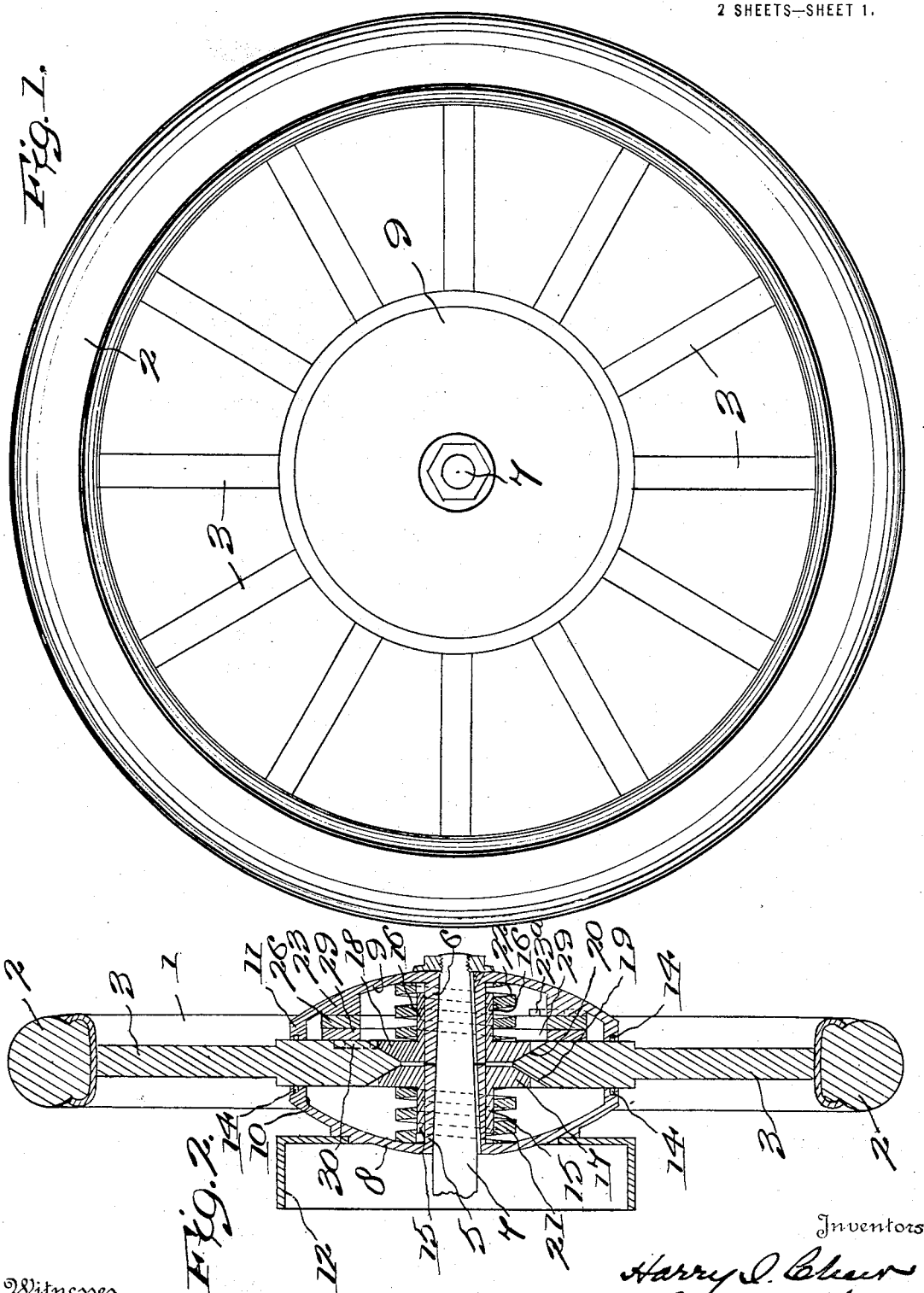
Witnesses
J. H. Byrne
S. M. Kenealy
Inventors
Harry I. Chew
and Walter S. Sergeant
By H. H. Byrne
Attorney

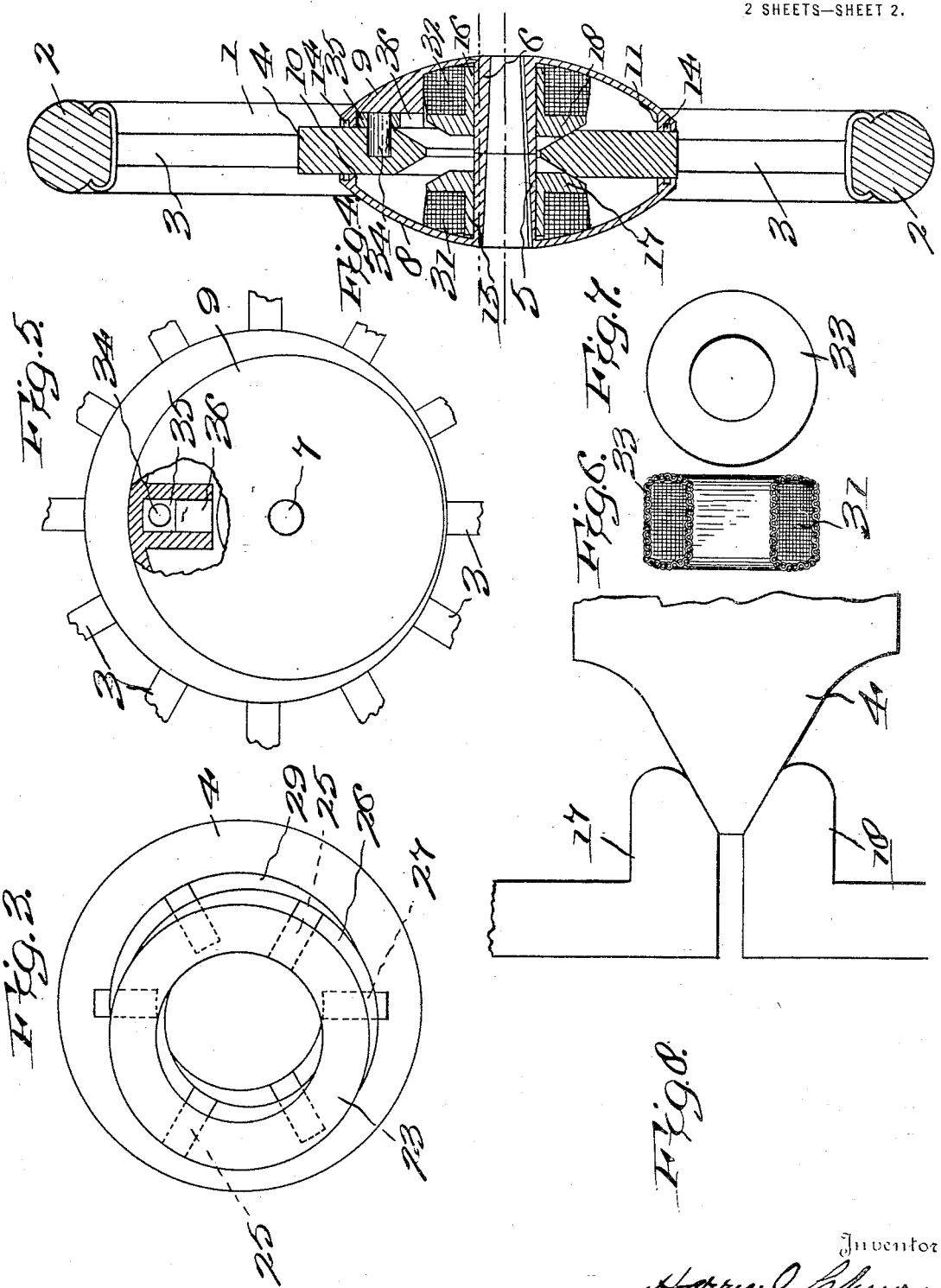

UNITED STATES PATENT OFFICE.

HARRY I. CHEW AND WALTER S. SERGEANT, OF WASHINGTON, DISTRICT OF COLUMBIA, ASSIGNORS, BY DIRECT AND MESNE ASSIGNMENTS, TO HUB SHOCK ABSORBER WHEEL COMPANY, OF LANCASTER, PENNSYLVANIA, A CORPORATION OF PENNSYLVANIA.

RESILIENT WHEEL.

1,177,486.   Specification of Letters Patent.   Patented Mar. 28, 1916.

Application filed May 19, 1914, Serial No. 839,521. Renewed September 30, 1915. Serial No. 53,426.

*To all whom it may concern:*

Be it known that we, HARRY I. CHEW and WALTER S. SERGEANT, citizens of the United States of America, residing at Washington, in the District of Columbia, have invented certain new and useful Improvements in Resilient Wheels, of which the following is a specification.

The present invention relates to resilient wheels for vehicles and consists in the combinations and arrangements of elements hereinafter disclosed and particularly set forth in the accompanying claims.

The invention has for its purpose to provide a wheel having means associated with the hub thereof which serves both as the resilient medium and shock absorber for the vehicle, and wherein all motion incident thereto are transmitted axially of the wheel, to the end of obtaining substantially complete flexibility with maximum rigidity of wheel structure.

Summarily stated the invention contemplates the provision of cushioning on buffer plates the provision of cushioning on buffer elements constituting a component part of the wheel hub and operable to receive and dissipate with lateral thrust all jarring or strains to which the wheel is normally subjected.

The invention is shown by way of illustration in the accompanying drawings wherein:

Figure 1 illustrates the application of the invention to an ordinary vehicle wheel. Fig. 2 is a central vertical sectional view of the same. Fig. 3 is an enlarged and detailed perspective view of the flexible connection between the hub and wheel *per se*. Fig. 4 is a central sectional view illustrating another form of the invention. Fig. 5 is an elevational view, partly in section, showing the connection between the hub and wheel in Fig. 4. Fig. 6 is a detailed view of one of the cushioning or buffer elements employed in the construction shown in Fig. 4. Fig. 7 is a front elevational view of said element, and Fig. 8 illustrates a contemplated form of the coöperating wedge elements.

Referring to the construction in further detail and wherein like characters of reference indicate corresponding parts in the different views shown, 1 designates the rim of any vehicle wheel having mounted thereon a tire 2, and 3 are the spokes which at the center unite into the form of a disk 4 and which disk together with said spokes and rim will hereinafter be referred to as "a rim".

The wheel hub comprises two members or parts 5 and 6 which are mounted on the axle 7, and are constructed with integral side plates 8 and 9 respectively. Said plates 8 and 9 are formed with inturned edges 10 and 11 which are disposed to have free contact or engagement with the opposite faces of the rigid rim portion 4, as clearly shown in Fig. 2. Said hub plates 8 and 9 are of substantially convex-concavo design in cross-section and form a substantially complete inclosure or housing for the wheel resilient elements contained therein. A brake-band plate 12 is secured to rotate with the hub plate 8 as will be understood. And a pair of fiber rings or cords or other suitable material 14 are carried by the plate portions 10 and 11 to bear against the rim portion 4 and prevent the ingress of foreign matter within the housing, or egress of grease or oil necessary to the mechanism.

A pair of sleeves 15 and 16 is mounted to have axial movement on the hub sections 5 and 6 within the housing and said sleeves are formed with cone heads 17 and 18 respectively. The conical surfaces of said cone heads bear in contact with the relatively angular faces 19 and 20 formed or otherwise mounted on the inner peripheral surface of the rim portion and provide a floating mount or support for the wheel through the resiliency of the pair of spiral springs 21 and 22 that are mounted on the sleeves 15 and 16 and abut against the cone heads 17 and 18 and the hub plates 8 and 9 after the manner clearly shown in Fig. 2.

From the foregoing it will be readily seen that a means is provided for floating a rigid wheel rim in a manner to effect the taking up of all strains and jarring of the wheel, by thrusts in a direction parallel with the axis of the wheel, and thereby relieving the body of the vehicle of such strains and their consequent disadvantages.

A flexible driving connection is provided between the wheel rim and the hub and consists of an annular portion 23 that is formed integrally with and on the inner face of the hub plate 9. Said annulus 23 has a pair of diametrically opposite grooves 25 formed therein that receive a pair of complementary formed members 23ᵃ on a washer or ring 26 that is disposed immediately against the annulus 23. Said ring 26 is in like manner provided with a pair of diametrically opposite grooves or channels 27 that receive the keys 28 of the adjacent ring or washer 29. The ring 29 has a similar key and groove engagement 30 with the rim portion 4. The several pairs of key and slot engagements are disposed at sixty degree intervals to the end of uniformity of operation in the relative movements between the wheel rim and hub.

In the arrangement shown in Figs. 4 and 5 the elements are constructed and operate in essentially the same manner as that above described. In this instance however, the buffer or cushioning elements for floating the wheel rim consists of rubber rings 31 and 32 that are mounted respectively on the cone sleeves 15 and 16 after the manner of that described of the spring buffers 21 and 22. The pair of buffers 31 and 32 may be inclosed within a covering of fabric or other suitable material 33 (see Fig. 6).

The connection between the hub and wheel rim consists of a radially acting pin and slot engagement, wherein the pin 34 is carried by the rim portion 4 and is journaled in squared block or bearing member 35 working in the slot 36. This connection between the wheel rim and hub allows the free rotation of the wheel rim with the hub and at the same time permits the wheel rim to have independent radial movement. Thus in Fig. 4 the relative position of parts indicates that the wheel rim has moved radially relative to the hub or in other words that their respective axes have separated. In Fig. 2, on the other hand, the wheel rim is restored or at normal *i. e.*—the rim axis and hub axis coincide.

In the arrangement shown in Fig. 8 the coacting or complementary cam faces of the rim portion 4 and cone disks 18 and 17 are of relatively greater pitch or angularity to the end that as the limit of relative movement between the rim and hub is approached the compression thrust of the resilient elements will be augmented—*i. e.*, to increase the resistive power of the resilient elements with regard to the pressure of the rim when the latter exceeds certain limits of its movement.

While we have shown and described certain apparatus for accomplishing the result initially stated it is to be understood that we are not limited to the precise details shown but may on the other hand adopt such modifications or changes within the scope of the claims to better suit the end in view; for instance, the flexible connection between the rim and hub may not be necessary to a wheel that does not have power transmitted to same by the axle being rotated by an engine or other power element in order to propel the vehicle to which it is attached.

Having thus described our invention what we claim as new and desire to protect by United States Letters Patent is:—

1. In a resilient wheel the combination of hub sections having integral side plates with proximate and inturned peripheral portions providing lateral sustaining elements; a pair of sleeves mounted to have axial movement on the hub and having wedge elements; resilient elements disposed intermediate the respective wedge elements and side plates; a rigid wheel rim floatingly mounted on said wedge elements, and radially movable between said side plates and laterally sustained thereby, substantially as described.

2. In a resilient wheel the combination of a hub comprising sections, each having a sleeve with a radially disposed end portion providing a sustaining side plate, and the peripheries of said side plates being inturned; sleeves having cone heads mounted and axially movable on said hub sleeves; resilient elements interposed between said cone sleeves and the side plates; a wheel rim floatingly mounted on said cone heads and fitting closely between and laterally sustained by the inturned peripheral portions of said side plates.

3. In a resilient wheel the combination of a hub comprising sleeve sections having the distal ends thereof with integral and inwardly inclined side plates, and the peripheral edges of said plates forming lateral bearing elements; sleeves having cone heads mounted and axially movable on said hub sleeves; resilient elements interposed between said cone sleeves and the side plates; a wheel rim having a central disk portion floatingly mounted on said cone heads, said disk portion fitting closely and radially movable between said lateral bearing elements and laterally sustained thereby; and a flexible connection between said disk portion and one of said side plates within the hub, substantially as described.

4. In a resilient wheel a pair of bearing sleeves having relative axial movement and having the active surfaces thereof of progressively increasing angularity and a radially movable wheel rim having relatively angular surfaces contacting with the angular surfaces of the bearing sleeves whereby the sleeves are initially moved axially at uniform speed and upon further radial movement of the rim said sleeves are forced also in the direction of the wheel axis to gradually lessen and finally stop the axial movement of said sleeves.

5. In a resilient wheel a pair of bearing sleeves having relative axial movement and having the active surfaces thereof of progressively increasing angularity; and a radially movable wheel rim having relatively angular surfaces of progressively increasing angularity contacting with the angular surfaces of the bearing sleeves whereby the sleeves are initially moved axially at uniform speed and upon further radial movement of the rim said sleeves are forced also in the direction of the wheel axis to gradually lessen and finally stop the axial movement of said sleeves.

In testimony whereof we affix our signatures in presence of two witnesses.

HARRY I. CHEW.
    WALTER S. SERGEANT.

Witnesses:
 J. FRANK DENT,
 H. S. TOWNSEND.